United States Patent
Chan

[19]

[11] Patent Number: 6,155,161
[45] Date of Patent: Dec. 5, 2000

[54] FOOD PROCESSING APPARATUS

[75] Inventor: Jackson Chak Sang Chan, Hong Kong, The Hong Kong Special Administrative Region of the People's Republic of China

[73] Assignee: Chiaphua Industries Limited, Hong Kong, The Hong Kong Special Administrative Region of the People's Republic of China

[21] Appl. No.: 09/307,236

[22] Filed: May 7, 1999

[51] Int. Cl.[7] .............................. A47J 43/044; B01F 7/20
[52] U.S. Cl. ................................ 99/348; 99/510; 99/513; 366/146; 366/251
[58] Field of Search .............................. 99/287, 348, 513, 99/510; 366/251, 249, 146

[56] References Cited

U.S. PATENT DOCUMENTS

| | | | |
|---|---|---|---|
| 4,151,792 | 5/1979 | Nearhood | 366/251 X |
| 5,285,717 | 2/1994 | Knepler | 99/307 X |
| 5,372,422 | 12/1994 | Dubroy | 366/251 X |
| 5,819,636 | 10/1998 | Khashoggi | 99/348 X |
| 5,980,099 | 11/1999 | Soon | 366/249 X |

FOREIGN PATENT DOCUMENTS 2116417  9/1983  United Kingdom ..................... 99/348

*Primary Examiner*—Reginald L. Alexander
*Attorney, Agent, or Firm*—Jackson Walker L.L.P.

[57] ABSTRACT

A soya milk processing apparatus includes a container and a grinding element that fits to a top of the container. An electric motor 18 having a drive coupling is supported above the grinding element so that the drive coupling of the grinding element can be engaged as required. The motor is supported on a bracket that allows the motor and its drive coupling to move downwards and upwards so that the container and the grinding element can be removed when a processing cycle has been completed.

6 Claims, 5 Drawing Sheets

FOOD PROCESSING APPARATUS

BACKGROUND OF THE INVENTION

1. Field of the Invention

The invention relates to food processing apparatuses.

2. Description of the Prior Art

The invention relates more particularly to apparatus where it is necessary to grind up beans or other solid raw material and then heat or boil a strained residue of the grinding operation in water or other liquid. Such an apparatus is a soya milk making apparatus. It is known to carry out such processes of grinding and boiling sequentially to make soya milk but at present the apparatus is difficult to handle and to clean. The process requires pouring and transfer of the grinding residue and water between containers and the lifting, moving and the supporting of a relatively heavy electric drive motor.

SUMMARY OF THE INVENTION

It is an object to overcome or at least reduce these problems.

According to the invention there is provided a food processing apparatus for preparing soya milk and the like, comprising a stand having a base with a planar platform and an upstanding support column, an electric heating element in the base below the platform, an electric motor mounted on the column with a downward facing first drive coupling, an open topped container that stands on the platform below the first drive coupling, a grinding element that rests on top of the container with its grinding blades positioned inside the container having an upward facing second drive coupling, in which the first and second drive couplings are arranged so as to be engaged with one another and held together during use, at the completion of a preparation cycle the couplings disengaged and the container removed from the stand, the grinding element lifted out of the container, and the container used directly to dispense the processed food.

The first coupling may be supported by a bracket that is movable down and up to engage and disengage the first coupling with the second coupling.

The bracket may be mounted to a screwed coupling of a cap that is arranged to move the bracket down and up when the cap is rotated.

The first coupling is preferably surrounded by a clamp that moves with the coupling to urge against and hold down a top of the grinding element when the first and second couplings are engaged.

Electrical contacts may be included that move down and up with the first coupling to engage and disengage electrical contacts on the grinding element.

Electric probes may be provided that are exposed and extend into the container and are supported on either side of the grinding element by the grinding element.

BRIEF DESCRIPTION OF THE DRAWINGS

A food processing apparatus for preparing soya milk according to the invention will now be described by way of example with reference to the accompanying drawings in which.

DESCRIPTION OF THE PREFERRED EMBODIMENTS

Figure 1:
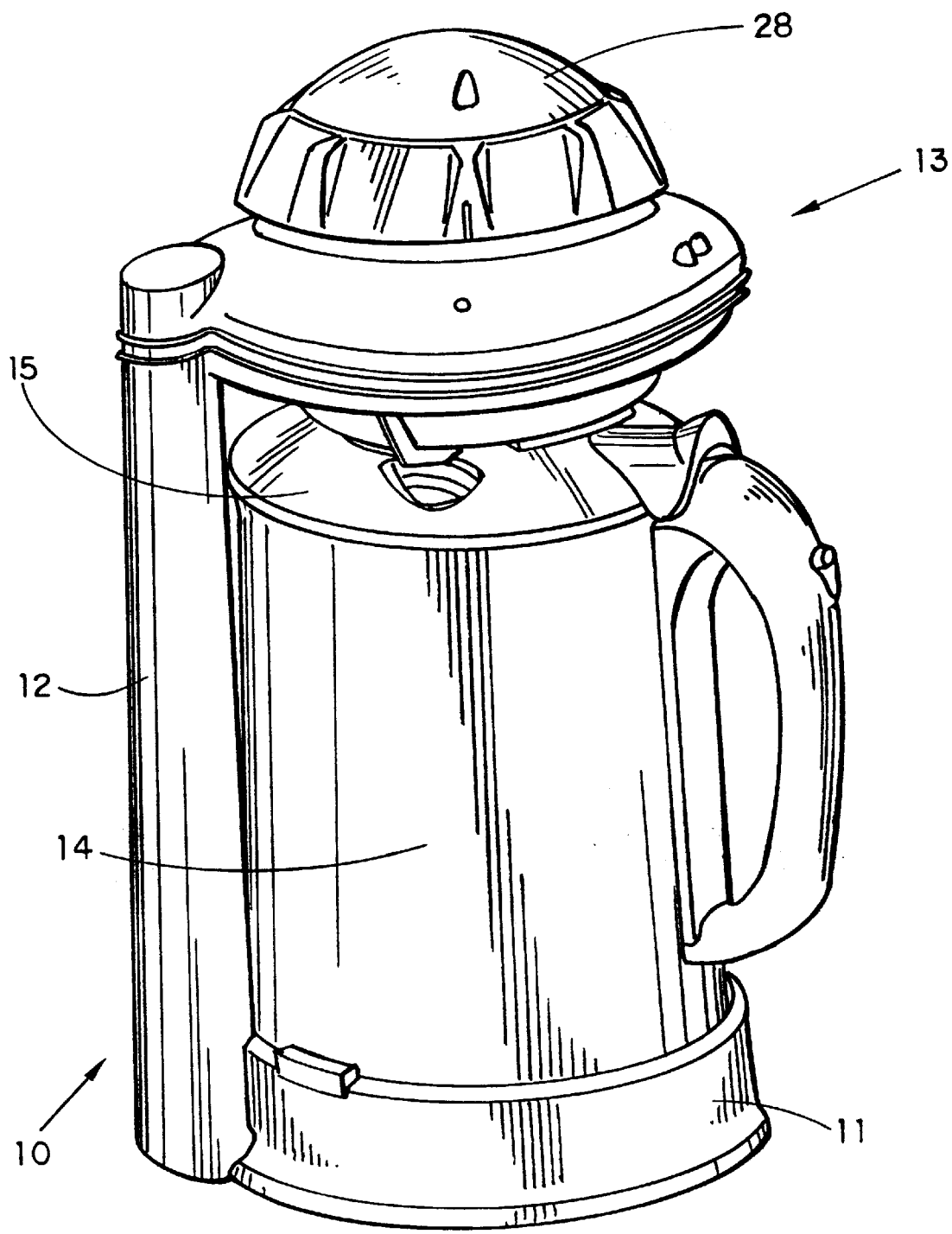
FIG. 1 is an isometric elevation of the apparatus.
Figure 2:
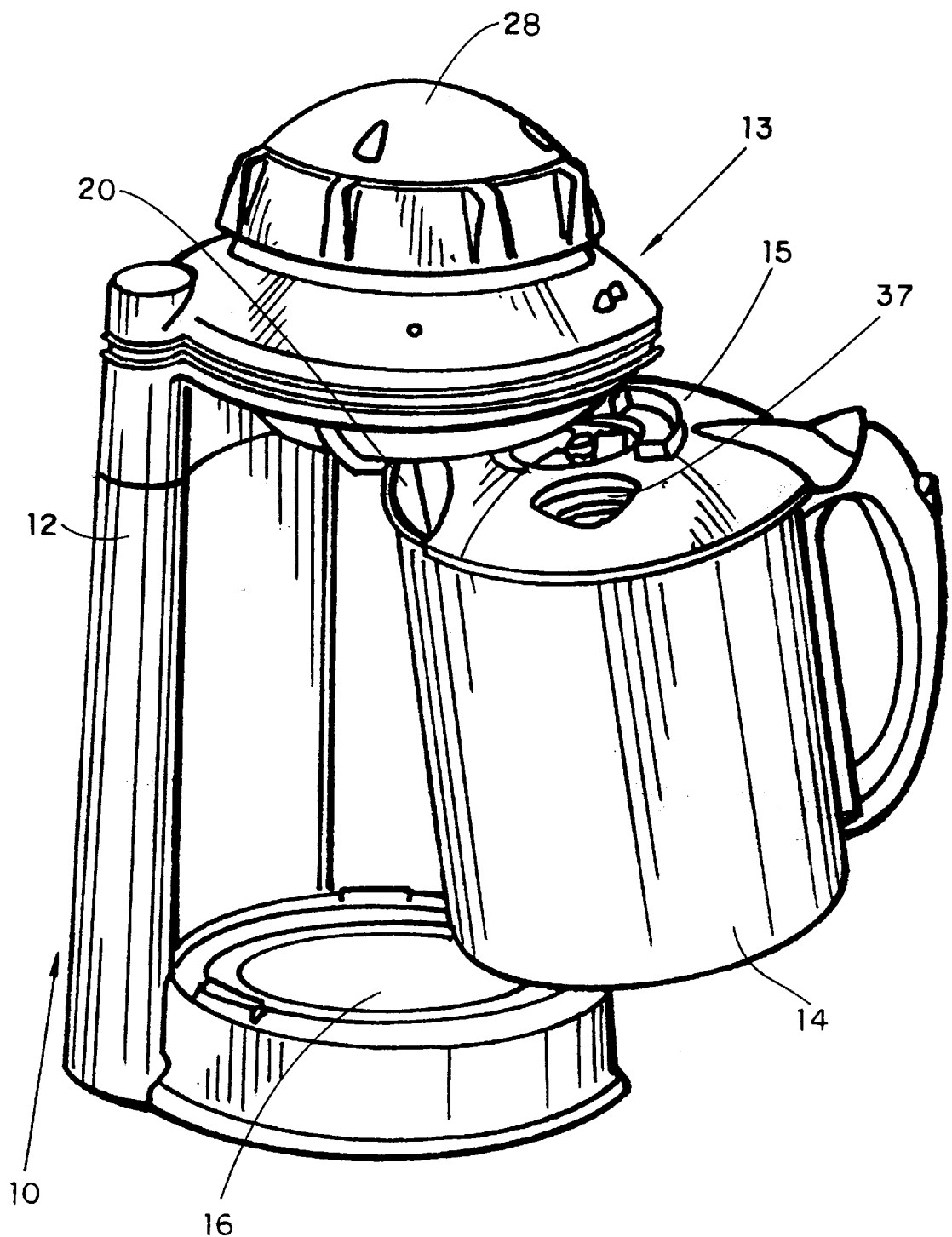
FIG. 2 is an isometric elevation of the apparatus showing a jug container partially removed.

Referring to the drawings, in FIG. 1 the apparatus comprises a stand 10 having a base 11 and an upstanding support column 12. A top assembly 13 is mounted on a top of the column 12. An open-topped jug container 14 fits between the base 10 and the assembly 13 and has a lid 15 which is part of a grinding element, to be described below. It will be seen in FIG. 2 that the container 14 can be lifted sideways out of the apparatus.

Figure 3:
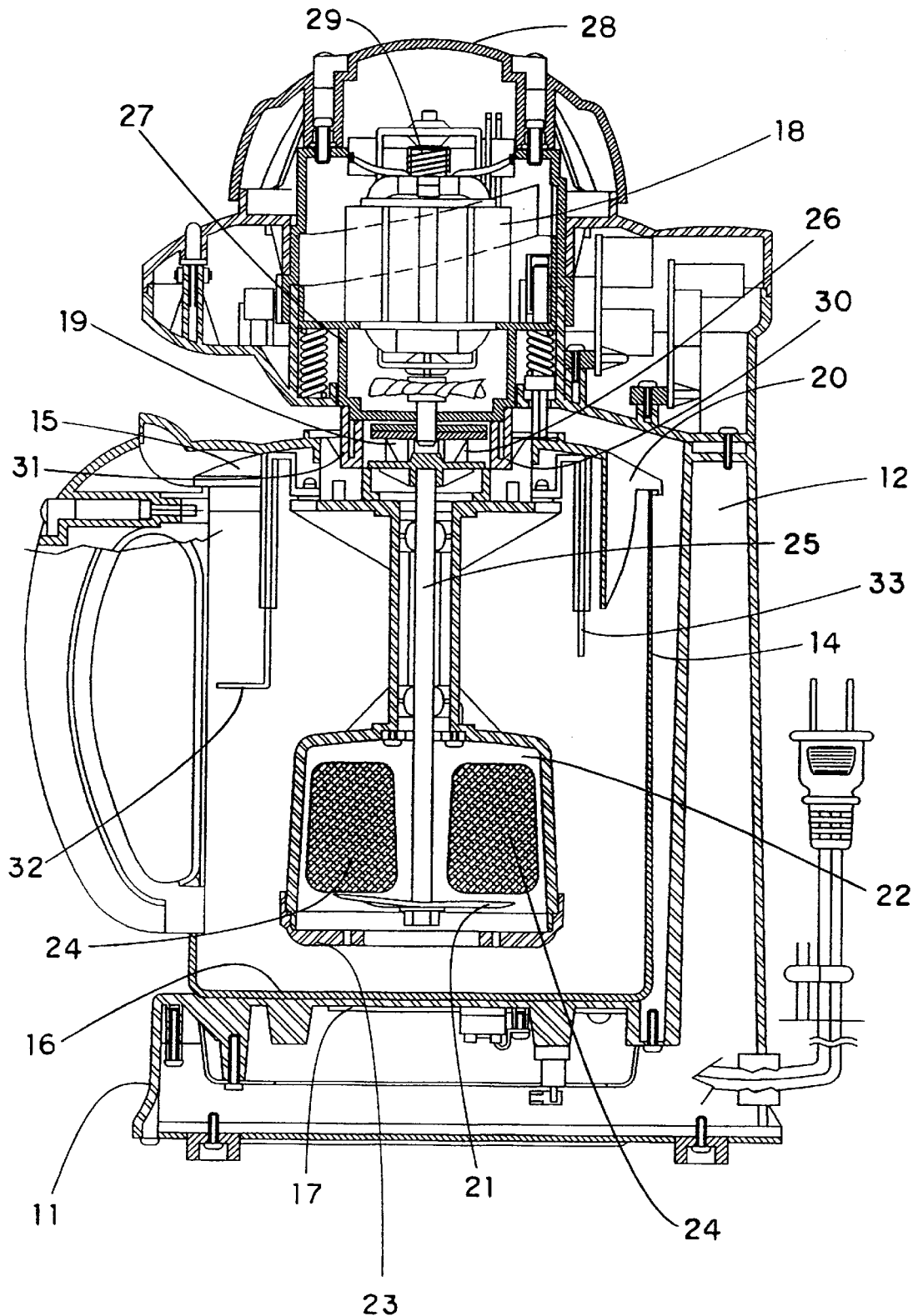
FIG. 3 is a detailed sectional elevation of the apparatus.
Figure 4:
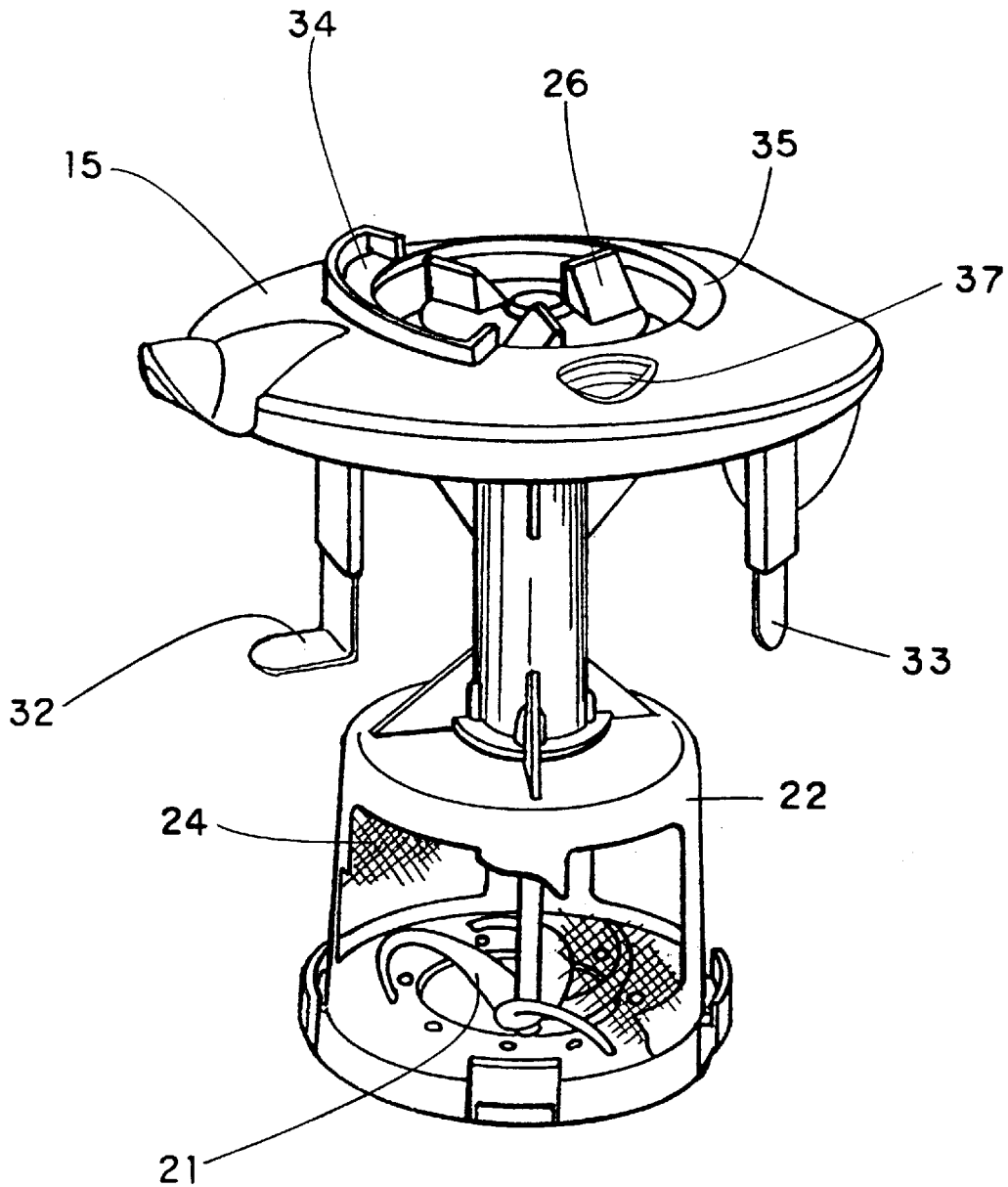
FIG. 4 shows an isometric elevation of a grinding element for the apparatus.
Figure 5:
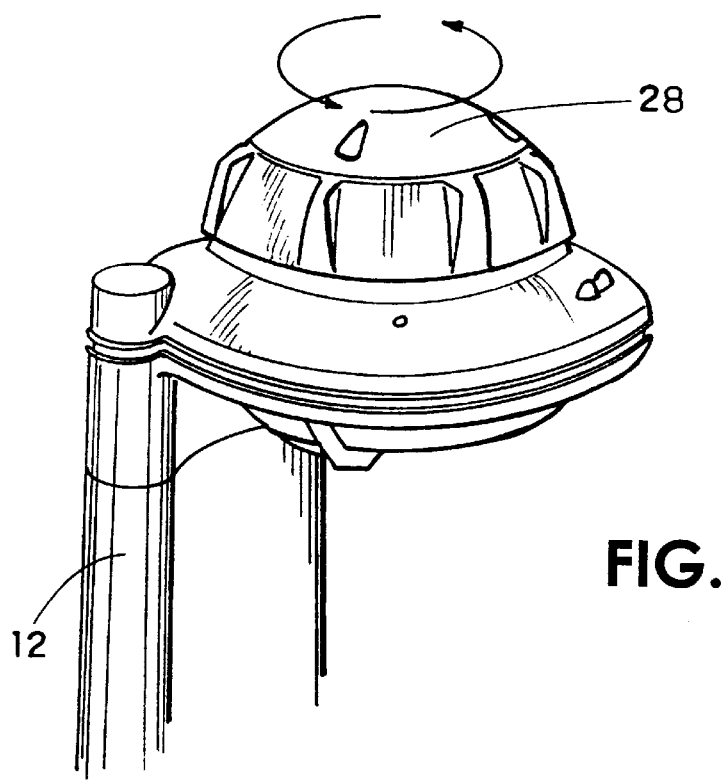
FIG. 5 shows an isometric view of a top assembly for the apparatus.
Figure 6:
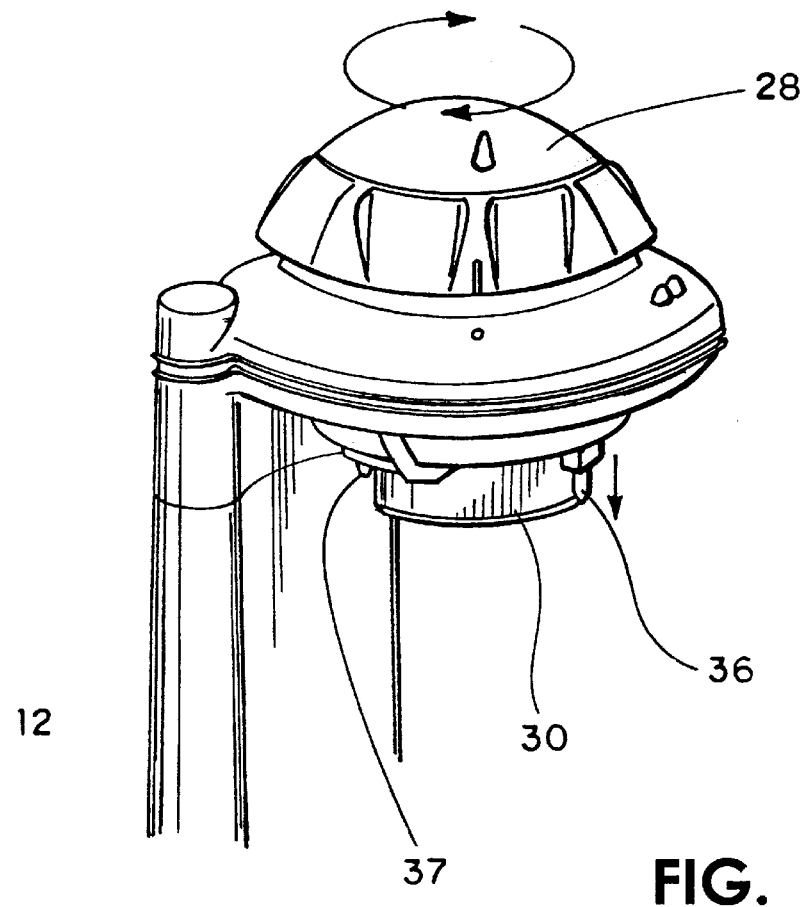
FIG. 6 shows an isometric view of the top assembly in a different of its configurations.

In FIG. 3, the base 11 has a planar platform 16 on which the container 14 is supported in use and heated by an electric heating panel 17. An electric motor 18 is mounted inside the top assembly 13 with its rotor connected directly to a downward facing first coupling 19.

The grinding element includes the lid 15 that fits snugly into the top of the container 14. (A missing segment of the lid at 20 does however allow the contents of the container to be poured out or water to be poured into the container 14 without removing the lid 15.) The grinding element includes a rotatable blade 21, a hopper 22 that has a screwed-on removable lid 23. The hopper has a number of apertures in sidewalls (the lid 23 may also have a central aperture) that are covered with mesh pieces 24. (The grinding element is however in general terms well-known in itself.)

The blade 21 is mounted on a shaft 25 that has an upward facing second coupling 26 at one end. In FIG. 3, the first and second couplings 19 and 26 are held in engagement so that the motor 18 can drive the blade 21 as required during use. The motor 18 and coupling 19 are mounted on a bracket 27 that is movable up and down by rotating a cap 28. As the cap 28 is rotated its central inner section screws down and up on a threaded bolt 29. The cap 28 is shown fully screwed down in FIG. 3 and if the cap 28 is "unscrewed", the bracket 27 is free to move upwards biassed by a set of springs 29 (two springs are shown in FIG. 3), the first coupling 19 moves upwards and out of engagement with the second coupling 26.

It will be seen that the bracket 27 extends downwards and is provided with a rubber ring 30 that surrounds the first coupling 19. The rubber ring fits snugly into a circular trough 31 integrally formed on the top of the lid 15. This ensures that the lid is held firmly down against the top of the container 14 and that the shaft 25 remains centralised with respect to the rotational axis of the motor 18. This ensures therefore that good mechanical connection is maintained between the couplings 19 and 26 during use, and that the grinding element and container 14 are firmly located and held together in position as required.

There are two electrical probes 32 and 33 mounted inside the container 14 and supported by and positioned under the lid 15. These probes are used to enable automatic central control of the apparatus, for example to detect that froth has risen up inside the container during heating to indicate boiling has started. An electrical path between the probes provided by the froth significantly changes the effective impedance between the probes. (Such control arrangements relying on the generation of froth are known in similar kinds of apparatus.) The probes are electrically connected to flat contacts 34 and 35 which in use make electrical contact with prongs 36 and 37 mounted in the top assembly 13 and which move with the frame 27. This arrangement allows electrical signals to pass from inside the container 14, when in use, to the stand 10. The stand incorporates a central control unit (not shown) mounted inside the stand in otherwise conventional manner. Such control unit is arranged to automatically control the operations of the heating plate 17 and the motor 18 during each processing cycle.

In use of the apparatus, the hopper 22 is filled with a quantity of soya beans, which are normally pre-soaked. The grinding element is fitted to the top of the jug container 14 which has been pre-charged with a desired quantity of water. The container is placed on the platform 16 and the centre of the lid 15 aligned with the coupling 19. The cap 28 is rotated to urge the coupling 19 downwards and to press the rubber ring 29 into the trough 30 and urge the prongs 36 and 37 against the contacts 34 and 35. This action also brings the couplings 19 and 26 into engagement, starts the motor, and represents the beginning of a cycle.

At first the heater panel 17 is turned ON continuously and the motor operated intermittently to allow material to slump back into the path of the cuter blades 21. After a period of time, the motor is turned OFF. The heater panel continues to heat the water mixed with the residue of the grinding operation until froth rises up to extend between the probes 32 and 33 to indicate that the mixture is boiling. This causes the controller to turn OFF the heater panel 17 for a period of time. The heater is then turned ON automatically until froth rises up again to the probes 32 and 33, and the heater is turned OFF again. The heater is turned ON and OFF in this manner until the mixture has been boiled for a total of about 12 minutes. This ensures that the soya residues are neutralised or vaporized.

When the cycle is completed, the cap 28 is unscrewed to allow the frame 27 to rise up and the container 14 and grinding element to be removed from the stand 10. The grinding element is then lifted off and out of the container 14 and the soya milk can be poured out of the container 14 as and when required. Opposing finger- thumb grips 37 are provided in the top of the lid 15 to facilitate lifting of the grinding element.

It will be noted that the full preparation cycle can be carried out without manual intervention and that after completion of the cycle, the container 14 can be readily used to serve and store the soya milk. The electric motor 18 is supported throughout the food processing by the stand 10 so that no heavy or awkward lifting is necessary when using the apparatus. The apparatus components, including the grinding element, are easy to separate, wash and clean between uses of the apparatus.

The apparatus can be used for any food preparation that involves grinding and the subsequent heating of ground up materials. The actual sequence and the respective amounts periods of grinding, heating and boiling can be easily varied by programming the central controller in a manner well-understood in the programmable controller art, according to different materials and user individual requirements. Also, the gauge of the mesh pieces 24 may be chosen, or changed, according to those requirements of and in accordance with different starting materials and/or preferred choices of the user.

I claim:

1. A food processing apparatus for preparing soya milk comprising:
    a stand having a base with a planar platform and an upstanding support column;
    an electric heating element in said base below said platform;
    an electric motor mounted on said column with a downward facing first drive coupling;
    an open topped container on said platform below said first drive coupling;
    a grinding element on top of said container with grinding blades positioned inside said container having an upward facing second drive coupling, said first coupling supported by a bracket movable down and up to engage and disengage said first coupling with said second coupling, said first and second drive couplings arranged so as to engage one another and hold together during use, said couplings disengaging and said container removable from said stand upon completion of a preparation cycle, said grinding element liftable from said container, and said container directly dispensing processed food; said bracket mounted to a screwed coupling of a cap arranged to move said bracket down and up when said cap is rotated.

2. A food processing apparatus according to claim 1, wherein said first coupling is surrounded by a clamp that moves with said first coupling to urge against and hold down a top of said grinding element when said first and second couplings are engaged.

3. A food processing apparatus according to claim 1, further comprising electrical contacts that move down and up with said first coupling to engage and disengage electrical contacts on said grinding element.

4. A food processing apparatus according to claim 3, further comprising electric probes that are exposed and extend into said container and are supported on either side of said grinding element by said grinding element.

5. A food processing apparatus for preparing soya milk comprising:
    a stand having a base with a planar platform and an upstanding support column;
    an electric heating element in said base below said platform;
    a movable electric motor mounted on said column with a vertical rotor directly connected to a downward facing first drive coupling;
    an open topped container on said platform below said first drive coupling;
    a grinding element on top of said container with grinding blades positioned inside said container having an upward facing second drive coupling, said first and second drive couplings arranged so as to engage with one another and hold together during use, said couplings disengaging and said container removable from said stand upon completion of a preparation cycle, said grinding element liftable out of said container, and said container directly dispensing processed food.

6. A food processing apparatus according to claim 5, wherein said movable electric motor is supported by a bracket movable down and up to engage and disengage said first coupling with said second coupling.

* * * * *